Dec. 1, 1959  F. I. ERNEST  2,915,316
FLUID PRESSURE OPERATED CHUCK
Filed May 24, 1956  2 Sheets-Sheet 1

INVENTOR.
FREDERICK I. ERNEST.
BY
Eugene C. Knoblock
ATTORNEY

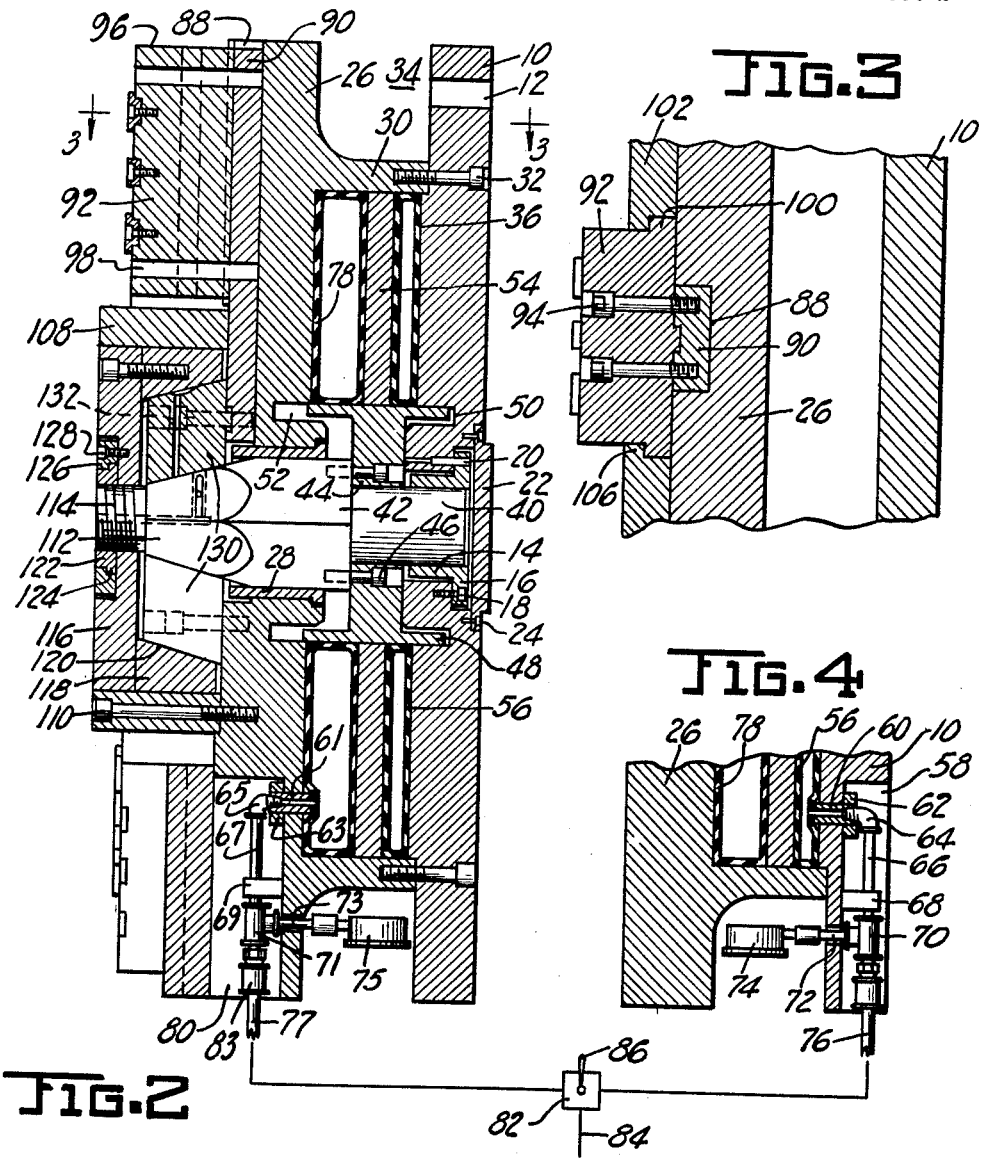

United States Patent Office 2,915,316
Patented Dec. 1, 1959

2,915,316

FLUID PRESSURE OPERATED CHUCK

Frederick I. Ernest, Elkhart, Ind.

Application May 24, 1956, Serial No. 587,007

11 Claims. (Cl. 279—4)

This invention relates to improvements in work-holding chucks, and more particularly to a fluid pressure operted chuck.

The primary object of the invention is to provide a chuck or work holder by means of which a work piece may be rapidly mounted and dismounted relative to a machine capable of performing a function or operation thereon, in which the operation and actuation of the chuck is performed selectively in response to fluid pressure and in which novel means are provided to translate the fluid pressure into mechanical operation of the chuck or work holder.

A further object is to provide a device of this character wherein a fluid pressure member shifts a mechanism in an axial direction at an angle to a work holder or chuck having radially shiftable jaws located in a predetermined plane, and wherein beveled surfaces upon said axially and said radially shiftable parts cooperate to radially project and retract said jaws incident to and depending upon the direction of axial movement of the pressure responsive mechanism.

A further object is to provide a device of this character having a body mounting an axially shiftable part including an abutment engaged by an annular bladder mounted in a cavity of said body which receives said axially shiftable part.

A further object is to provide a device of this character which is adaptable to any machine and which may have a source of fluid pressure either mounted upon the machine by which it is carried or located externally relative to said machine.

Another object is to provide a device of this character wihch is novel in construction, simple in operation, inexpensive to construct, economical in operation, and which is capable of applying to a work piece the amount of force necessary to effectively grip the same.

Other objects will be apparent from the following specification.

In the drawings:

Fig. 2 is an axial sectional view taken on line 2—2 of Fig. 1;

Fig. 3 is a fragmentary sectional view taken on line 3—3 of Fig. 2; and

Fig. 4 is a fragmentary radial sectional view taken on line 4—4 of Fig. 1.

Figure 1:
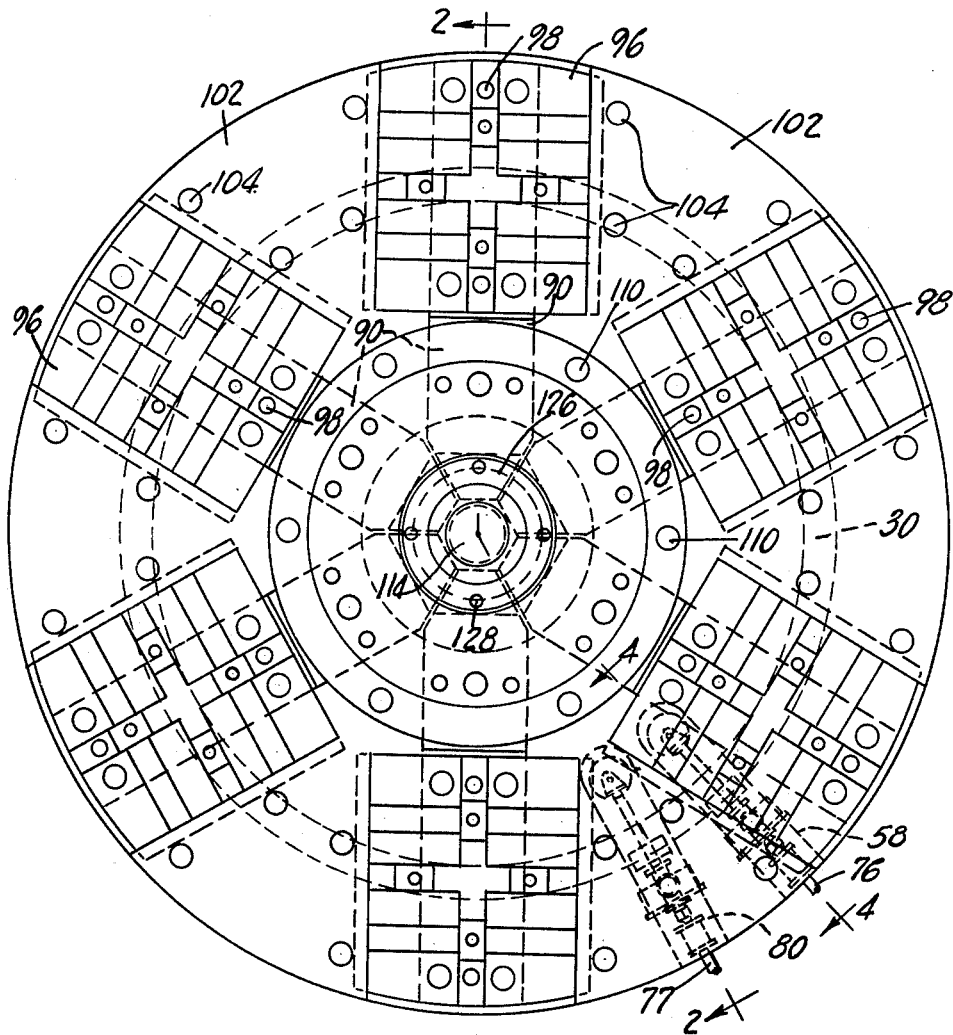
Fig. 1 is a face view of the device.

Referring to the drawings which illustrate the preferred embodiment of the invention, the numeral 10 designates a base plate which may be provided with a plurality of spaced apertures 12 to accommodate securing means (not shown) for attachment of the base plate to a support, such as a machine tool or a work carrier associated with a machine tool. The plate 10 preferably has a central opening which may be of stepped configuration. The opening preferably mounts a bushing 14 having a flange 16 seating in an inner step portion of said opening and preferably secured to the plate 10 by securing members 18. If desired, pilot members, such as dowels 20, may be employed to guide and orient the bushing relative to the plate opening. A pilot plate 22 preferably seats in the outer step surrounding the bushing receiving opening and is preferably secured in place by securing members, such as cap screws 24.

A body member 26 is carried by the base plate 10 and preferably is generally in the shape of a flat plate substantially parallel to the base plate 10. The body has a central aperture which is lined by a bushing 28 coaxial with the bushing 14 and preferably of larger diameter. A tubular or cylindrical projection 30 extends from one face of the body member 26 into end engagement with the base plate 10 to which it is secured by any suitable means, such as the cap screws 32. The tubular member 30 is preferably of a diameter less than the dimensions of the base plate 10 and the body 26 to provide an annular pocket or groove 34 around the device to accommodate access to securing members passing through the apertures 12 and for other purposes to be mentioned. The base plate 10 and body 26 and the tubular member 30 coperate to define a circular cavity 36.

A shaft is mounted to slide axially in the bushings 14 and 28, said shaft including comparatively small diameter portion 40 slidable in bushing 14 and a large diameter portion 42 slidable in the bushing 28. An annular member 44 encircles a portion of the small diameter shaft 40 and seats against the shoulder defined between the same and the large shaft portion 42 and is secured thereto by securing means, such as cap screws 46. The annular member 44 has endless flanges 48 of substantially tubular or cylindrical form projecting therefrom at each side thereof to provide a total axial dimension thereof which is greater than the axial dimension of the chamber 36. An endless groove 50 is formed in the base plate 10 to receive one of the flanges 48 and an endless groove 52 is formed in the body member 26 to receive the other flange 48. A flat annular plate 54 projects outwardly of the member 44 beyond the flanges 48 and substantially centrally relative thereto to define a piston. The outer diameter of the piston plate 54 is preferably slightly less than the inner diameter of the cylindrical flange 30 to accommodate free movement of the piston in the chamber 36. The flanges 48 have a snug but sliding fit in the grooves 50 and 52 and preferably have only a slight clearance with the large diameter surface of said grooves, as illustrated.

An outer annular expandable and collapsible bladder 56, preferably formed of rubber or synthetic rubber, fits in the chamber 36 between the base plate 10 and the piston plate 54 with its outer margin confined by the cylinder 30 and its inner margin confined by the outer or righthand flange 48, as viewed in Fig. 2. The base plate 10 is externally recessed at 58 to accommodate a fluid pressure line leading to and communicating with the bladder 56. The bladder 56 has a tubular stem 60 projecting therefrom through an aperture in the base plate 10 and communicating with the recess 58. A nut 62 is screw-threaded on the outer end of the stem 60 to anchor the stem in place. An elbow 64 has screw-threaded connection with the stem 60 and in turn is connected to a nipple 66 carried by a block 68 suitably secured to the base plate 10. A pipe T 70 is joined to the nipple 66 and preferably has a nipple 72 extending through an aperture in the base plate 10 and communicating with a pressure gauge 74 located in the annular cavity 34. A supply line 76 is connected to T 70.

A second or inner bladder 78 of annular shape fits between the piston plate 54 and the body 26 with its outer margin confined by the cylindrical flange 30 and its inner margin confined by the inner cylindrical flange 48 of the piston plate 54. The body 26 has a radial recess 80 formed therein which receives the parts of the air pressure line leading from an air supply line 77 and preferably constructed similarly to the line which communicates with the bladder 56. Specifically, the bladder 78 has a stem 61 extending through an aperture in the body 26 and into the cavity 80 to be anchored by nut 63. Elbow 65 is connected to stem 61 and has communication with nipple 67 supported in block 69 and communicating with T 71. Nipple 73 is connected with the T 71 and extends through an aperture in the body to pass into the annular recess 34 in which is mounted a pressure gauge 75 connected to the nipple 73. Supply line 77 is connected to T 71.

The device as described, or one utilizing only a single expansible bladder, is associated with control means for controlling energization thereof. There is schematically illustrated in association with Figs. 2 and 4, a control member 82 shown as interposed between the lines 76 and 77 and as connected with a line 84 extending to the source of fluid under pressure. The control element 82 preferably has an operating handle or like member 86 for regulating and controlling the supply of fluid from the supply line 84 to one or the other of lines 76, 77 or for positioning the same in a neutral position which will maintain the fluid pressure status of both fluid pressure bladders constant. Control element 82 will be of the character which bleeds fluid pressure from one line when fluid pressure from the supply 84 is directed to the opposite line, as between the lines 76 and 77. In the event only a single bladder is employed, as in the case where the nature of the device which the bladder operates introduces movement in one direction, as by means of a return spring, the operating bladder which is employed will be so located as to operate in opposition to such return means. In such a single bladder type of construction, the control member may be of simple construction having a pressure supply position, a bleed pressure position, and an intermediate position to maintain fluid pressure in the bladder constant. In cases where the chuck is mounted to rotate, the fluid supply means will include manually bleedable chuck valves 83 and detachable couplings (not shown) between the chuck valves 83 and the supply lines, such as lines 76, 77.

The bladder actuated piston construction may be used to operate any type of chuck or work holder, for example of the type shown in my Patent No. 2,469,873, dated May 10, 1949, and preferably one in which chucking means operates between released position and chucking position in response to axial reciprocation of an actuating shaft. One form of such chucking mechanism is illustrated in the drawing, having a plurality of chucking jaws shiftable in a radial direction in response to axial movement of the shaft 40, 42. In this construction the outer face of the body 26 is provided with a plurality of radial grooves 88, preferably extending from the central opening in the body to the outer edge thereof. These grooves will preferably be equispaced and equiangularly related and, as here shown, in Fig. 1, six thereof are provided in one form of the device. This number is illustrative and is not intended to be limiting. An actuating arm of a length slightly shorter than the groove 88 is slidable in each groove. Each of the actuating arms 90 mounts a jaw member 92 secured to said arm in any suitable manner, as by means of cap screws 94. The jaws 92 may be of any shape and form desired for contacting the work to be gripped thereby. In particular, the jaws may have work-engaging outer end surfaces 96 as here shown, or the inner end surfaces thereof may be configured for engagement with the work piece. Dowel members 98 may be carried by the jaws 92 to seat in apertures in the arms 90 for the purpose of maintaining proper registration in cases where the jaws 92 are removably mounted upon the arms by means of cap screws 94. The side margins of the jaws are preferably parallel and include narrow marginal parallel side flanges 100 at the inner portion of the jaws at or adjacent the body 26. Retainer plates 102, preferably of substantially the shape of a segment, are secured to the body 26 in any suitable manner, as by means of cap screws 104. The converging side or marginal portions of the retainers 102 are preferably undercut to provide marginal flanges 106 behind which jaw flanges 100 are located, the flanges 106 of adjacent retainers being parallel to the adjacent groove 88 so as to form a uniform guide for the jaw 92 therebetween through the full length of the stroke of said jaw. A ring 108 is secured to the body 26, as by means of cap screws 110 located between actuating arms 90. The ring 108 is preferably so positioned as to provide a retainer cooperating with the retainer plates 102 for the purpose of guiding and positioning movement of the actuating arms 90 and jaws 92.

The shaft 40, 42 has a tapered portion projecting forwardly from the body 26 and preferably characterized by a plurality of flat surfaces 112 equal in number to the number of actuating arms 90 and each being located opposite the end of one of the grooves 88. Surfaces 112 are located in planes equiangularly oriented to the axis of the shaft 40, 42, and preferably equiangularly disposed with respect to each other in circumferential direction. The shaft terminates in a reduced screw-threaded end portion 114. A cup-shaped member having a base plate portion 116 encircles the reduced shaft portion 114 and mounts an outer wedge portion or portions 118 at its margin. Said outer wedge portion projects toward the body 26 and has a tapered face 120 whose angular relation to the axis of the shaft 40, 42 is preferably substantially the same as the angular relation of each of the faces 112 of that shaft to the axis of the shaft. The base plate 116 preferably has a central recess within which is received a nut 122 threaded on shaft part 114 and having a projecting marginal flange 124 overlapped by an undercut adjusting ring 126 which may be secured in place in any suitable manner, as by means of cap screws 128. The cup-shaped unit defined by the base plate 116 and the outer wedge 118 is thus mounted fixedly upon the shaft 40, 42 to move axially with said shaft. Said cup-shaped structure will preferably have a snug sliding fit within the ring 108.

Each of the actuating arms 90 mounts an inner wedge member 130 at its inner end. Each of the wedge members 130 has an outer surface tapered to conform to the taper of the inner surface 120 of the outer wedge member, and also has an inner surface tapered to substantially conform to the taper of the adjacent tapered shaft face 112. The wedge members 130 are secured to the actuating arms 90, as by means of cap screws 132.

The inner wedge members 130 ride upon the tapered surfaces 112 and 120 incident to axial movement of the shaft 40, 42, and serve as the means to translate the axial movement of the shaft into radial movement of the actuating arms 90. Observe in this connection that a movement of the shaft 40, 42 toward the left from the position illustrated in Fig. 2 will cause the shaft surfaces 112 to slide upon the inner surfaces of the inner wedges 130 which are restrained against movement in the same direction as the shaft by the retainers 102 and 108 acting upon the actuating arms 90 and the jaws 92 with which the inner wedges 130 are associated. Consequently, movement of the shaft toward the left, as seen in Fig. 2, will cause radial outward movement of the wedge members 130 and their associated actuating arms 90 and master jaws 92. This outward movement of the inner wedge members 130 is accompanied by the endwise movement of the outer wedge members 118 forming parts of the cup-shaped assembly 116, 118 which is mounted upon the shaft 40, 42 to travel therewith. Since the angle between the surfaces 120 and the axis of the shaft is the same as the angle between the surfaces 112 and the axis of the shaft, a free sliding movement of the parts occurs without any lost motion and without any binding action. This outward movement, in the case of the chuck shown having the outer work-engaging surfaces 96, will proceed until the work piece to be mounted by the jaws is engaged and firmly pressed upon by each of the jaws at a bore in that work piece.

Reverse movement of the shaft 40, 42 from a position at the left of that shown in Fig. 2 back to the Fig. 2 position will cause axial sliding of the outer wedge members 118 against the outer surfaces of the inner wedge members 130 to force said wedge members radially inwardly as accommodated by the retracting movement of the tapered shaft surfaces 112 which engage the inner surfaces of wedge members 130. Such movement in the case of the construction as shown, having the outer work-engaging jaw surfaces 96, will release the work piece from the jaws. However, in cases where it is desired to grip a work piece at its outer margin, in which case the inner ends of the master jaws have the work-engaging surfaces, the radial inward stroke of the inner wedges 130 and their associated actuating arms 90 and master jaws 92 will constitute the work-engaging stroke and will proceed until the inner faces of the jaws clamp upon the work piece.

The fluid pressure actuation of the chuck provides in the device all of the advantages which commonly characterize fluid pressure actuated mechanisms. Thus the stroke of the device may vary as required despite slight differences in the sizes of work pieces, while at the same time the force which is exerted upon the work piece to grip the same will be uniform upon each stroke and upon each individual work piece. The force exerted in each case, assuming operation of the device through a period of time adequate to exert that force, will be determined by the pressure setting effected at the controller 82 and effective at the source of fluid pressure. This reduces the need for high accuracy of the constituent parts inasmuch as the device becomes substantially self-centering and self-balancing insofar as the operation of the jaws is concerned.

One of the important characteristics of the device is that the problem of seals to avoid leakage of fluid pressure is overcome by reason of the use of the bladders. The bladders provide expansible fluid pressure chambers at opposite sides of the pistons without necessitating the position of seals between relatively moving parts, such as between the piston and the chamber in which the piston travels. At the same time substantially the full pressure of the fluid is effective to act against the piston. Furthermore, should any leakage occur due to breakage of a bladder, the bladder can readily be replaced by simply separating the body 26 from the base plate 10 so as to afford access to the defective bladder for removal thereof and replacement.

It will be observed that the annular bladders will insure the positive uniform application of pressure throughout the full area of the piston so that there will be no tendency to bind the piston, the shaft or other working parts. The annular bladders also accommodate the achievement of a high effective working pressure upon the shaft.

Another important characteristic of the device is that it may be mounted upon any machine regardless of whether or not the machine is supplied with a source of fluid under pressure. In cases where the machine to which the chuck is applied is not equipped with a fluid pressure source, such a source may be provided separately and connected to the mechanism through flexible conduit means, as will be readily apparent. The method of attachment of the device to a machine may vary widely, and one obvious manner is to provide an adapter (not shown) providing a portion to which the base plate 10 may be secured and another portion constructed suitably to be mounted upon the particular machine to which the device is to be attached.

The use of two opposed bladders on opposite sides of a piston plate of large area and annular shape, in association with a control for supplying fluid under pressure to one of the bladders and for bleeding fluid pressure from the other bladder, or for retaining fluid pressure in both bladders, is important from the standpoint of the flexibility of the device which is produced through this arrangement. Positive operation of the device for both work-chucking and work-releasing actions is thus afforded and both operations are powered by an adequate amount of power to insure ready accomplishment of the purpose.

One of the important characteristics of the device is to so relate the thickness of the piston carrier 44 to the space between the base plate 20 and the body 26 in which it is free to move with respect to the axial dimension of the chamber 36 and the thickness of the piston plate 54 as to insure that movement of the piston in one direction will be stopped without completely collapsing a bladder. Thus, observe that Fig. 2 illustrates a maximum collapsed position of the bladder 56 as a result of the fact that the member 44 engages the inner surface of the face plate 10. No pinching of the bladder can occur where the space between piston 54 and base plate 10 is greater than twice the thickness of the walls of the bladder, as there shown. In other words, in retracted position, the chamber receiving the bladder is sufficiently large to accommodate contraction of the bladder and provide clearance between the bladder and the contracted bladder chamber.

It will be understood that the master jaws 92 as here shown, need not be the parts which actually engage the work. Thus separate work-engaging jaw parts (not shown) of a shape determined by the shape of a work piece may be mounted removably on the jaws 92 if desired.

While the preferred embodiment of the invention has been illustrated and described, it will be understood that changes in the construction may be made within the scope of the appended claims without departing from the spirit of the invention.

I claim:

1. A fluid pressure operated chuck comprising a rigid structure having a chamber and a bore communicating with and substantially centrally positioned relative to said chamber, a shaft slidable endwise in said bore, a plate secured to said shaft and projecting into said chamber, a resilient annular fluid container in said chamber encircling said shaft and bearing against one surface of said plate, and work-engaging means carried by said structure and actuated by said shaft, said structure having an endless groove communicating with said chamber in spaced encircling relation to said bore, and an endless flange carried by said plate and slidable in said groove, said bladder encircling said endless flange.

2. A fluid pressure operated chuck comprising a rigid structure having a chamber and a bore communicating with and substantially centrally positioned relative to said chamber, a shaft slidable endwise in said bore, a plate secured to said shaft and projecting into said chamber, a cylinder coaxial with said shaft and carried by said plate, a pair of resilient annular bladders encircling said cylinder within said chamber and on opposite sides of said plate, said chamber having annular grooves receiving said cylinder, said cylinder spanning said chamber axially in all positions thereof, selectively operable means for controlling the supply of fluid under pressure to and release of fluid from said bladders, and work-holding means carried by said structure and actuated by movement of said shaft.

3. A device as defined in claim 1, wherein said structure has an aperture communicating with said chamber spaced from said plate and an outer recess communicating with said aperture, and means for supplying fluid under pressure to said bladder including a tubular bladder stem projecting through said aperture and stem-connected means located in said recess.

4. A device as defined in claim 1, and means for limiting movement of said shaft in bladder-collapsing direction to maintain said bladder-receiving chamber portion of an axial dimension greater than twice the thickness of the walls of said bladder.

5. A work holder comprising a body having a chamber and a bore, a shaft shiftable endwise in said bore, a piston carried by said shaft and shiftable in said chamber, an annular bladder in said chamber, a cylinder carried by said piston and shiftable in said chamber, said bladder encircling said cylinder, said cylinder axially spanning the portion of said chamber receiving said bladder in all positions thereof, means for selectively applying fluid pressure to said bladder at one side of said piston, and work-carrying means shiftably carried by said body and actuated by said shaft.

6. A work holder comprising a body having radial guides, a chamber and an axial bore, a shaft shiftable endwise in said bore, a piston carried by said shaft and shiftable in said chamber, means for selectively applying fluid pressure to said chamber at one side of said piston, a plurality of jaws slidable in said body guides in radial relation to said shaft and having a projection at one face thereof, said shaft having a tapered portion engaged by said jaws and jaw projections, and a cup-shaped retainer on said shaft encircling said jaw projections for drawing said jaws inwardly upon movement of said shaft in one direction.

7. A work holder comprising a body having a chamber and a bore, a shaft shiftable endwise in said bore, a piston carried by said shaft and shiftable in said chamber, means for selectively applying fluid pressure to said chamber at one side of said piston, a plurality of jaws slidable on said body in radial relation to said shaft, each jaw having a projection at its inner end having inner and outer surfaces extending at an angle to the axis of the shaft, said shaft having a tapered surface engaging the inner tapered surface of said projection, and a member carried by said shaft and fitting around and engaging the outer surfaces of said projections.

8. A work holder comprising a body, a plurality of jaws, jaw-guiding means on said body, a shaft slidable endwise in said body at an angle to said jaws and located between said jaws, each jaw having a projection on the inner end thereof, said projections having tapered outer surfaces, and a retainer carried by said shaft and encircling said projections, said shaft having a tapered portion engaging the inner ends of said jaws.

9. A work holder comprising a body, a plurality of jaws, jaw-guiding means on said body, a shaft slidable endwise in said body at an angle to said jaws and located between said jaws, each jaw having a projection at the inner end thereof, a cup-shaped member carried by said shaft and encircling said projections, said shaft having a tapered portion engaging the inner ends of said jaws, the portion of said cup-shaped member encircling said projections being tapered correspondingly to the taper of said shaft.

10. A work holder comprising a body, a plurality of jaws, jaw-guiding means on said body, a shaft slidable endwise in said body at an angle to said jaws and located between said jaws, each jaw having a projection at the inner end thereof, a cup-shaped member carried by said shaft and encircling said projections, said shaft having a tapered portion engaging the inner ends of said jaws, the portion of said cup-shaped member encircling said projections being tapered correspondingly to the taper of said shaft, said projections having inner and outer surfaces tapered correspondingly to the tapered parts of said shaft and cup-shaped member respectively.

11. A fluid pressure operated chuck comprising a rigid structure having a chamber and a bore communicating with and substantially centrally positioned relative to said chamber, a shaft slidable endwise in said bore, a plate secured to said shaft and projecting into said chamber, a resilient annular fluid container in said chamber encircling said shaft and bearing against one surface of said plate, and work-engaging means carried by said structure, radially spaced parts carried by said shaft and engaging radially spaced parts of said work-engaging means to actuate said means, said structure having an aperture communicating with said chamber spaced from said plate and an outer recess extending adjacent to said one end of said chamber and communicating with said aperture, and means for supplying fluid under pressure to said bladder including a tubular bladder stem projecting through said aperture and stem-connected means located in said recess.

References Cited in the file of this patent

UNITED STATES PATENTS

| | | |
|---|---|---|
| 2,509,673 | Church | May 30, 1950 |
| 2,582,680 | Church | Jan. 15, 1952 |
| 2,620,196 | Church | Dec. 2, 1952 |
| 2,655,384 | Peterson | Oct. 13, 1953 |
| 2,697,612 | Sloan | Dec. 21, 1954 |
| 2,703,242 | Sloan et al. | Mar. 1, 1955 |